US012603968B2

(12) United States Patent
Wang et al.

(10) Patent No.: US 12,603,968 B2
(45) Date of Patent: Apr. 14, 2026

(54) PROJECTION POINT EXTRACTION METHOD

(71) Applicant: PRIMAX ELECTRONICS LTD., Taipei City (TW)

(72) Inventors: Hsiu-Wen Wang, Taipei City (TW); Chih-Wen Lin, Taipei City (TW)

(73) Assignee: PRIMAX ELECTRONICS LTD., Taipei City (TW)

( * ) Notice: Subject to any disclaimer, the term of this patent is extended or adjusted under 35 U.S.C. 154(b) by 176 days.

(21) Appl. No.: 18/631,096

(22) Filed: Apr. 10, 2024

(65) Prior Publication Data

US 2025/0227193 A1      Jul. 10, 2025

(30) Foreign Application Priority Data

Jan. 9, 2024     (TW) ................................. 113100935

(51) Int. Cl.
| | |
|---|---|
| *G06T 7/10* | (2017.01) |
| *G06T 5/30* | (2006.01) |
| *G06T 5/70* | (2024.01) |
| *G06V 10/75* | (2022.01) |
| *H04N 5/74* | (2006.01) |

(52) U.S. Cl.
CPC ................. *H04N 5/74* (2013.01); *G06T 5/30* (2013.01); *G06T 5/70* (2024.01); *G06V 10/751* (2022.01); *G06T 7/10* (2017.01); *G06T 2207/20036* (2013.01)

(58) Field of Classification Search
CPC ................................. G06T 7/10; G06V 10/751
See application file for complete search history.

(56) References Cited

U.S. PATENT DOCUMENTS 10,176,399 B1 *   1/2019   Rivard ................. G06V 30/153

* cited by examiner

*Primary Examiner* — Michael H Hong
(74) *Attorney, Agent, or Firm* — WPAT, PC

(57) ABSTRACT

A projection point extraction method for a detection system is provided. The detection system includes a projection module, a projection plane and a receiver. Firstly, an original image with plural projection points is projected. Then, a kernel is used to perform an erosion process on the original image, so that an erosion image is generated. Then, an intensity transformation process is performed on the erosion image according to an intensity threshold, so that a transformation image is generated. Then, a reconstruction process is performed on the transformation image according to the original image, so that a reconstruction image is generated. Then, a regional maxima process is performed on the reconstruction image, so that a mask map is generated. Afterwards, an extraction process is performed on the original image according to the mask map, so that a projection point extraction result is generated.

16 Claims, 9 Drawing Sheets

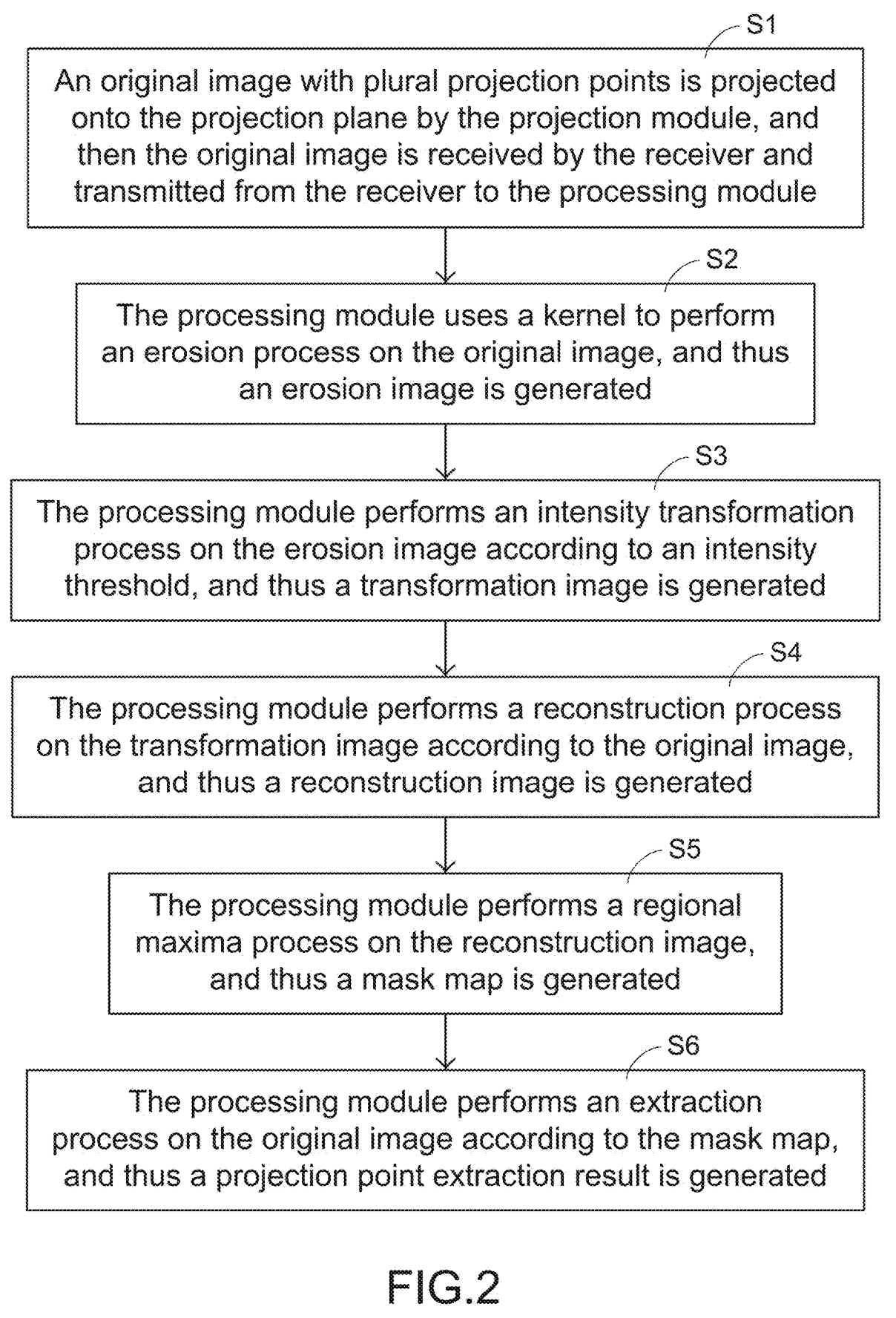

S1

An original image with plural projection points is projected onto the projection plane by the projection module, and then the original image is received by the receiver and transmitted from the receiver to the processing module

S2

The processing module uses a kernel to perform an erosion process on the original image, and thus an erosion image is generated

S3

The processing module performs an intensity transformation process on the erosion image according to an intensity threshold, and thus a transformation image is generated

S4

The processing module performs a reconstruction process on the transformation image according to the original image, and thus a reconstruction image is generated

S5

The processing module performs a regional maxima process on the reconstruction image, and thus a mask map is generated

S6

The processing module performs an extraction process on the original image according to the mask map, and thus a projection point extraction result is generated

FIG.2

| 61 | 51 | 48 | 50 | 48 | 50 | 51 | 59 | 70 |
| 58 | 51 | 48 | 50 | 55 | 51 | 51 | 55 | 55 |
| 52 | 49 | 53 | 60 | 69 | 64 | 56 | 53 | 52 |
| 51 | 50 | 64 | 83 | 105 | 94 | 70 | 57 | 50 |
| 51 | 55 | 73 | 127 | 180 | 128 | 80 | 58 | 54 |
| 51 | 55 | 69 | 106 | 139 | 104 | 72 | 56 | 51 |
| 51 | 53 | 61 | 72 | 80 | 73 | 59 | 52 | 49 |
| 58 | 50 | 53 | 57 | 57 | 56 | 53 | 50 | 49 |
| 61 | 54 | 49 | 50 | 50 | 51 | 51 | 53 | 55 |

20

$$
\begin{array}{ccc}
0 & 1 & 0 \\
1 & 1 & 1 \\
0 & 1 & 0
\end{array}
$$

FIG.4A

| | | | | | | | | |
|---|---|---|---|---|---|---|---|---|
| 51 | 48 | 48 | 48 | 48 | 48 | 50 | 51 | 55 |
| 51 | 48 | 48 | 48 | 48 | 50 | 51 | 51 | 52 |
| 49 | 49 | 48 | 50 | 55 | 51 | 51 | 52 | 50 |
| 50 | 49 | 50 | 60 | 69 | 64 | 56 | 50 | 50 |
| 51 | 50 | 55 | 73 | 105 | 80 | 58 | 54 | 50 |
| 51 | 51 | 55 | 69 | 80 | 72 | 56 | 51 | 49 |
| 51 | 50 | 53 | 57 | 57 | 56 | 52 | 49 | 49 |
| 50 | 50 | 49 | 50 | 50 | 51 | 50 | 49 | 49 |
| 54 | 49 | 49 | 49 | 50 | 50 | 51 | 50 | 49 |

| 49 | 48 | 48 | 48 | 48 | 48 | 50 | 51 | 52 |
| 49 | 48 | 48 | 48 | 48 | 50 | 51 | 51 | 52 |
| 49 | 49 | 48 | 50 | 55 | 51 | 51 | 52 | 50 |
| 50 | 49 | 50 | 60 | 65 | 64 | 56 | 50 | 50 |
| 51 | 50 | 55 | 65 | 65 | 65 | 58 | 54 | 50 |
| 51 | 51 | 55 | 65 | 65 | 65 | 56 | 51 | 49 |
| 51 | 50 | 53 | 57 | 57 | 56 | 52 | 49 | 49 |
| 50 | 50 | 49 | 50 | 50 | 51 | 50 | 49 | 49 |
| 50 | 49 | 49 | 49 | 50 | 50 | 51 | 50 | 49 |

P4

| | | | | | | | | |
|---|---|---|---|---|---|---|---|---|
| 51 | 51 | 48 | 50 | 48 | 50 | 51 | 55 | 55 |
| 51 | 51 | 48 | 50 | 55 | 51 | 51 | 55 | 55 |
| 51 | 49 | 53 | 60 | 65 | 64 | 56 | 53 | 52 |
| 51 | 50 | 64 | 65 | 65 | 65 | 65 | 57 | 50 |
| 51 | 55 | 65 | 65 | 65 | 65 | 65 | 58 | 54 |
| 51 | 55 | 65 | 65 | 65 | 65 | 65 | 56 | 51 |
| 51 | 53 | 61 | 65 | 65 | 65 | 59 | 52 | 49 |
| 53 | 50 | 53 | 57 | 57 | 56 | 53 | 50 | 49 |
| 53 | 53 | 49 | 50 | 50 | 51 | 51 | 53 | 53 |

```
0   0   0   0   0   0   0   0   0

0   0   0   0   0   0   0   0   0

0   0   0   0   1   0   0   0   0

0   0   0   1   1   1   1   0   0

0   0   1   1   1   1   1   0   0

0   0   1   1   1   1   1   0   0

0   0   0   1   1   1   0   0   0

0   0   0   0   0   0   0   0   0

0   0   0   0   0   0   0   0   0
```

P6

| | | | | | | | | |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 69 | 0 | 0 | 0 | 0 |
| 0 | 0 | 0 | 83 | 105 | 94 | 70 | 0 | 0 |
| 0 | 0 | 73 | 127 | 180 | 128 | 80 | 0 | 0 |
| 0 | 0 | 69 | 106 | 139 | 104 | 72 | 0 | 0 |
| 0 | 0 | 0 | 72 | 80 | 73 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

PROJECTION POINT EXTRACTION METHOD

FIELD OF THE INVENTION

The present invention relates to a projection point extraction method, and more particularly to a projection point extraction method using a morphological processing technology to distinguish the foreground projection points and background projection points in an image from each other.

BACKGROUND OF THE INVENTION

Nowadays, projection devices are widely used in the market. For allowing the projection power of the projection points to be revealed normally or allowing the projection points can be displayed uniformly, the projection device need to be subjected to quality inspection during the manufacturing process. Consequently, the information about intensity and distribution of each bright spot projected by the projection device can be obtained.

In accordance with a detection method, the coordinate information about the highest average intensity value of a specified projection point and the photography result of a receiver (e.g., a camera) are used for calibration, and the full width at half maximum (FWHM) of the projection point is calculated to determine the distance between the receiver and the projection point. Consequently, the projection point needs to be extracted. That is, it is necessary to distinguish the foreground projection point from the background next to it.

In other words, it is necessary to firstly obtain the intensity of each projection point and then determine whether the illumination quality is normal according to the brightness/darkness of the projection point or determine whether the overall intensity is uniform according to the intensity of each projection point. Therefore, it is very important to obtain the information of the projection point from the projected image. The application fields of such projection devices may include facial recognition, 3D scene detection, augmented reality (AR), virtual reality (VR), or the like.

At present, most of the detection extraction methods in the industries use a maximum inter-class variance method or a technology called Otsu binary algorithm to classify the pixels of the projected image as foreground pixels and background pixels. By using this method, the image is divided into two histograms of light and dark areas to maximize the variance of the two areas in the image. In case that the difference between the pixel values of the two areas is greater, the variance is larger. These two areas may include the background area and the foreground area, or these two areas may include any other area.

The Otsu algorithm has been widely used in image processing fields, image recognition fields, computer vision fields and other associated fields. It is an effective algorithm that is not easily affected by noise. By using this algorithm, the best threshold value in the image can be acquired quickly in order to distinguish foreground and background pixels.

However, the Otsu algorithm also has shortcomings. For example, if the intensity of the background is not much different from the intensity of the foreground, the use of the Otsu algorithm cannot easily distinguish the foreground projection point from the surrounding background, or even the center intensity of the actual projected image appears to be the maximum and harder to be segmented. In addition, if the number of projection points increases, it will be more difficult to distinguish the foreground and background. Even if a region of interest (ROI) is used to circumscribe blocks of areas for distinction, a distinction error is possibly generated because of the gradient change in the intensity.

SUMMARY OF THE INVENTION

An object of the present invention provides a projection point extraction method. The projection point extraction method uses a morphological processing technology to distinguish the foreground projection points and background projection points in an image from each other. Since the brighter projection points and darker projection points are taken into consideration, the output quality of the projection device will be enhanced.

In accordance with an aspect of the present invention, a projection point extraction method for a detection system is provided. The detection system includes a projection module, a projection plane, a receiver and a processing module. The projection point extraction method includes the following steps. Firstly, the projection module projects an original image with plural projection points onto the projection plane. After the original image is received by the receiver, the original image is transmitted to the processing module. Then, the processing module uses a kernel to perform an erosion process on the original image, so that an erosion image is generated. Then, the processing module performs an intensity transformation process on the erosion image according to an intensity threshold, so that a transformation image is generated. Then, the processing module performs a reconstruction process on the transformation image according to the original image, so that a reconstruction image is generated. Then, the processing module performs a regional maxima process on the reconstruction image, so that a mask map is generated. Afterwards, the processing module perform an extraction process on the original image according to the mask map, so that a projection point extraction result is generated.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2 is a flowchart of a projection point extraction method according to an embodiment of the present invention;

FIG. 4A schematically illustrates the kernel used in the projection point extraction method of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a projection point extraction method. An example of the projection point extraction method will be described as follows.

Figure 1A:
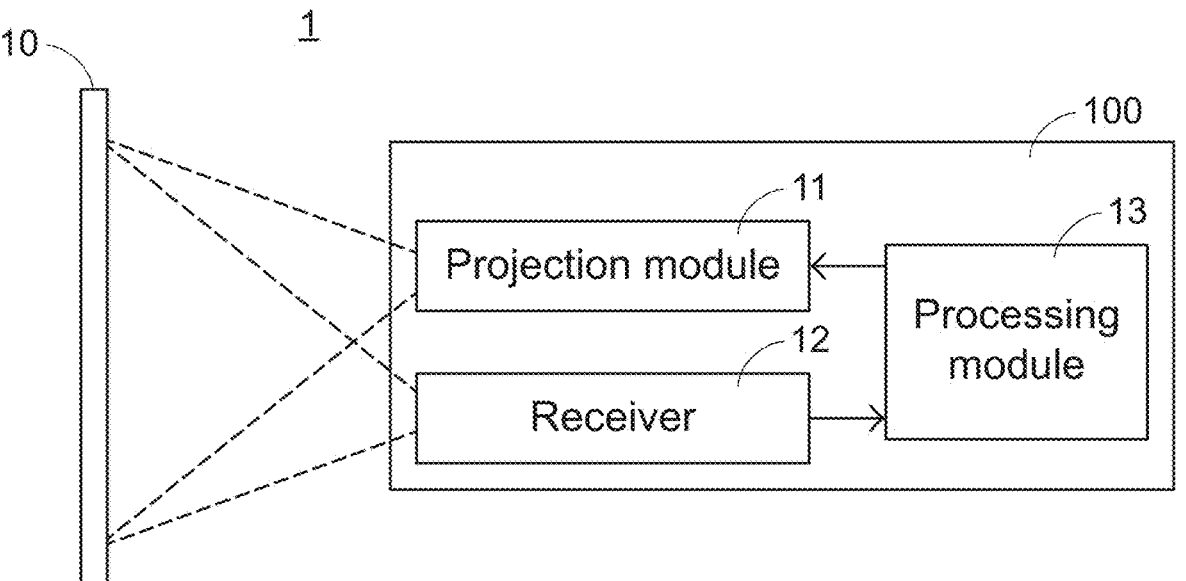
FIG. 1A schematically illustrates the architecture of a detection system using a projection point extraction method according to an embodiment of the present invention.
Figure 1B:
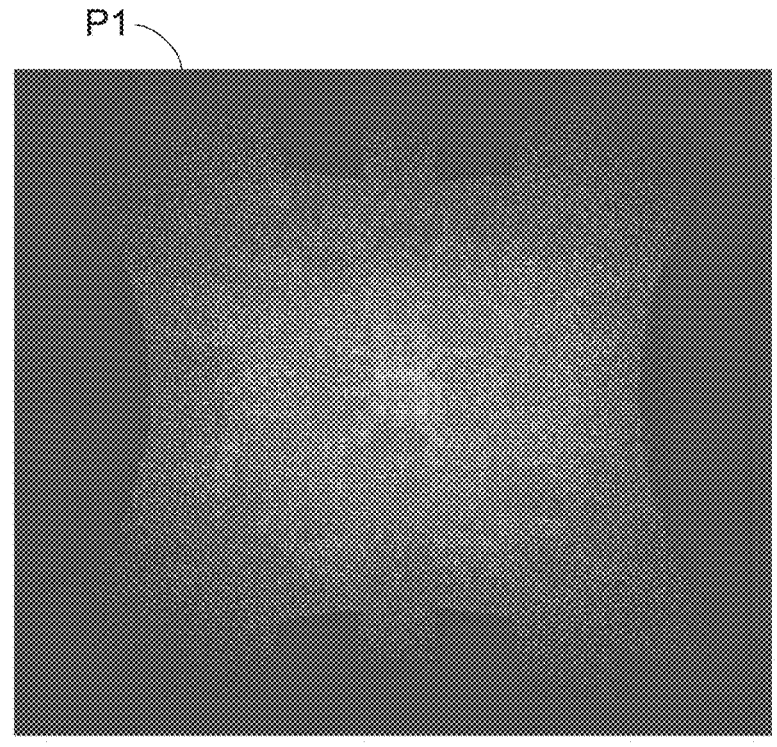
FIG. 1B schematically illustrates an original image projected on a projection plane by the detection system shown in FIG. 1A.

Please refer to FIGS. 1A and 1B. FIG. 1A schematically illustrates the architecture of a detection system 1 using a projection point extraction method according to an embodiment of the present invention. FIG. 1B schematically illustrates an original image P1 projected on a projection plane 10 by the detection system 1 shown in FIG. 1A.

As shown in FIG. 1A, the detection system 1 comprises a projection module 11, a projection plane 10, a receiver 12 and a processing module 13. In an embodiment, the projection module 11, the receiver 12 and the processing module 13 are located on the same side of the projection plane 10.

As shown in FIG. 1B, the original image P1 contains plural projection points. In addition, the original image P1 is an image to be corrected. That is, the original image P1 is a raw image that has not been subjected to any processing operation. The purpose of the present invention is to distinguish the foreground projection points from the surrounding background. In the example of FIG. 1B, the projection points located in the center of the image are brighter, and the projection points located at the edges of the image are darker.

In an embodiment, the processing module 13 is equipped with a firmware component to execute the projection point extraction method. Alternatively, the procedures of the projection point extraction method are stored as operation program codes. The operation program codes are stored in a flash memory (not shown) that is electrically connected with the processing module 13 and directly executed by the processing module 13. In an embodiment, the receiver 12 is a camera. In addition, the projection module 11, the receiver 12 and the processing module 13 are integrated as a projection device 100. Consequently, the detection of the projection device 100 is achieved by analyzing the projection quality of the original image P1.

FIG. 2 is a flowchart of a projection point extraction method according to an embodiment of the present invention. Firstly, an original image P1 with plural projection points is projected onto the projection plane 10 by the projection module 11, and then the original image P1 is received by the receiver 12 and transmitted from the receiver

12 to the processing module 13 (Step S1). Then, the processing module 13 uses a kernel 20 (e.g., the kernel shown in FIG. 4A) to perform an erosion process on the original image P1, and thus an erosion image P2 (e.g., the erosion image shown in FIG. 4B) is generated (Step S2). Then, the processing module 13 performs an intensity transformation process on the erosion image P2 according to an intensity threshold, and thus a transformation image P3 (e.g., the transformation image shown in FIG. 5A) is generated (Step S3). Then, the processing module 13 performs a reconstruction process on the transformation image P3 according to the original image P1, and thus a reconstruction image P4 (e.g., the reconstruction image shown in FIG. 6A) is generated (Step S4). Then, the processing module 13 performs a regional maxima process on the reconstruction image P4, and thus a mask map P5 (e.g., the mask map shown in FIG. 7A) is generated (Step S5). Afterwards, the processing module 13 performs an extraction process on the original image P1 according to the mask map P5, and thus a projection point extraction result P6 (e.g., the projection point extraction result shown in FIG. 8A) is generated (Step S6).

Figures 3A, 3B:
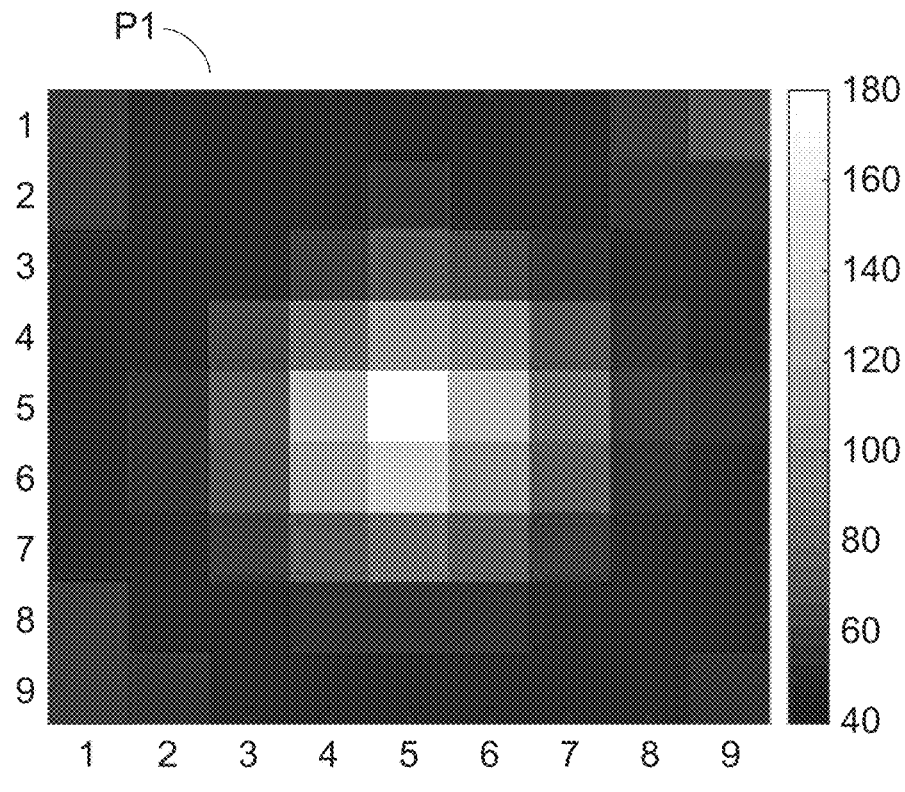
FIG. 3A schematically illustrates a portion of the original image.
FIG. 3B schematically illustrates the pixel values of the pixels in the original image shown in FIG. 3A.

The procedures of the step S1 will be described in more details with reference to FIGS. 3A and 3B. FIG. 3A schematically illustrates a portion of the original image P1. FIG. 3B schematically illustrates the pixel values of the pixels in the original image P1 shown in FIG. 3A.

In FIGS. 3A and 3B, a projection point (i.e., the bright spot) in the original image P1 is taken an example for illustration. The brighter part in the middle region of the original image P1 represents the projection point, and the darker part in the original image P1 represents the background around the projection point. In fact, the size of the original image P1 may be composed of thousands of projection points and tens of thousands of pixels. For illustration, the original image P1 in FIGS. 3A and 3B contains plural pixels in a 9×9 array arrangement. It can be understood that the values of the pixels closer to the bright part are larger and the values of the pixels away from the bright part are smaller. In this example, one projection point is composed of plural pixels (e.g., about 3×3 pixels).

Figures 4B, 4C:
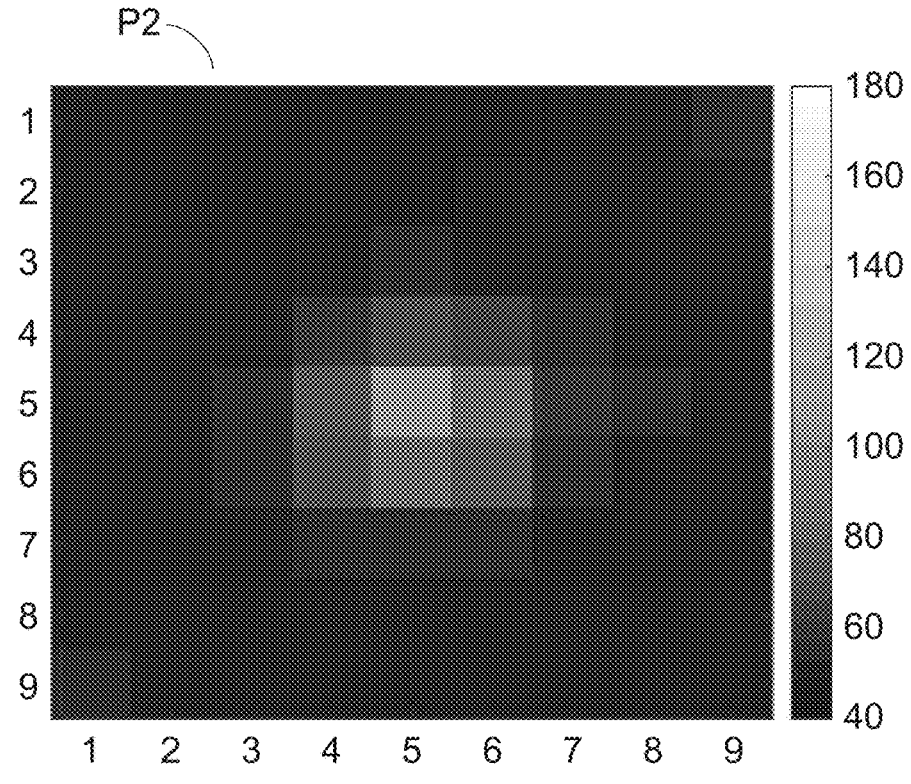
FIG. 4B schematically illustrates a portion of the erosion image.
FIG. 4C schematically illustrates the pixel values of the pixels in the erosion image shown in FIG. 4B.

The procedures of the step S2 will be described in more details with reference to FIGS. 4A, 4B and 4C. FIG. 4A schematically illustrates the kernel 20 used in the projection point extraction method of the present invention. FIG. 4B schematically illustrates a portion of the erosion image P2. FIG. 4C schematically illustrates the pixel values of the pixels in the erosion image P2 shown in FIG. 4B.

The kernel 20 is a matrix with a specified size in a morphological processing process, and the corresponding elements of the matrix have identical or different contents. In the example of FIG. 4A, a matrix with 3×3 pixels represents the kernel 20. The pixels of the corresponding elements in this matrix are either 1 or 0. For example, the pixels of the elements designed at the middle cross location are 1, and the pixels of the elements in the four corners next to them are 0.

As mentioned above, the erosion process is a morphological processing process. In an embodiment, the kernel 20 is used to scan the original image P1 and suppress the surrounding background of the projection point in the scanned original image P1. Consequently, the local maximum value of the corresponding projection point is obtained. Since there is a gap between the adjacent projection points, this process can be used to preliminarily separate the projection points from their surrounding background. The mathematical formula of this erosion process can be expressed as:

$$A \ominus B = \{p \mid \{p + b : b \in B\} \subseteq A\} \qquad \text{(formula 1)}$$

In the above mathematical formula, A represents the original image P1, B represents the kernel 20, p represents the pixel in the original image P1, and b represents the element in the kernel 20. In addition, {p+b: b∈B} represents the location of the kernel (B) in the original image (A).

Therefore, the erosion process comprises the following steps. Firstly, the kernel 20 is placed at any location of the original image P1, and the center of the kernel 20 is aligned with one pixel of the original image P1. Then, the kernel 20 scans the original image P1, and the pixels of the original image P1 at the locations corresponding to the elements of the kernel 20 are eroded. In addition, each element in the kernel 20 and the corresponding pixel are combined as a new pixel according to an erosion condition.

In the mathematic formula (1), (p+b) represents that the kernel (B) is translated to the location of the pixel (p) in the original image (A). When the kernel (B) is translated to the location of the pixel (p), each element (b) in the kernel (B) is added to the pixel (p) to form a new point (p+b). The translation set of the kernel (B) has a subset with the original image (A). That is, there is at least one subset of the translation set (p+b) and the original image (A). In this way, the result of the kernel (B) applied to the pixel (p) can be completely contained in the original image (A) through the erosion operation. Consequently, the area of the original image (A) with the same size as the kernel (B) will be eroded away. Therefore, assuming that the value of (p+b) is 1, the value of the pixel (p) will also become 1. Through the mathematical formula (A⊖B), the pixel value of the original image (A) that does not match the kernel (B) will become 0.

As mentioned above, the portion of the original image P1 shown in FIGS. 3A and 3B is the erosion target of the kernel 20 shown in FIG. 4A. After the original image P1 is subjected to the erosion process, the erosion image P2 shown in FIG. 4B is generated. The pixel values of the pixels in the corresponding locations of the erosion image P2 are shown in FIG. 4C. It can be understood that the size of the matrix designed for the kernel 20 and the values of the corresponding elements will affect the size and shape of the projection points (i.e., the bright spot) in the formed erosion image P2.

After the results of FIGS. 4B and 4C are compared with the results of FIGS. 3A and 3B, it can be found that the edge pixels of the projection point (i.e., the bright spot) are eroded. Moreover, regardless of the pixel in the center or the pixel on the edge, the intensity of the pixel after erosion is largely reduced. For example, the highest pixel value in FIG. 3B is 180, the highest pixel value in FIG. 4C is only 105, and the pixel values around the projection point representing the background have also been adjusted. That is, some of the pixel values are decreased, and some of the pixel values are increased.

Figures 5A, 5B:
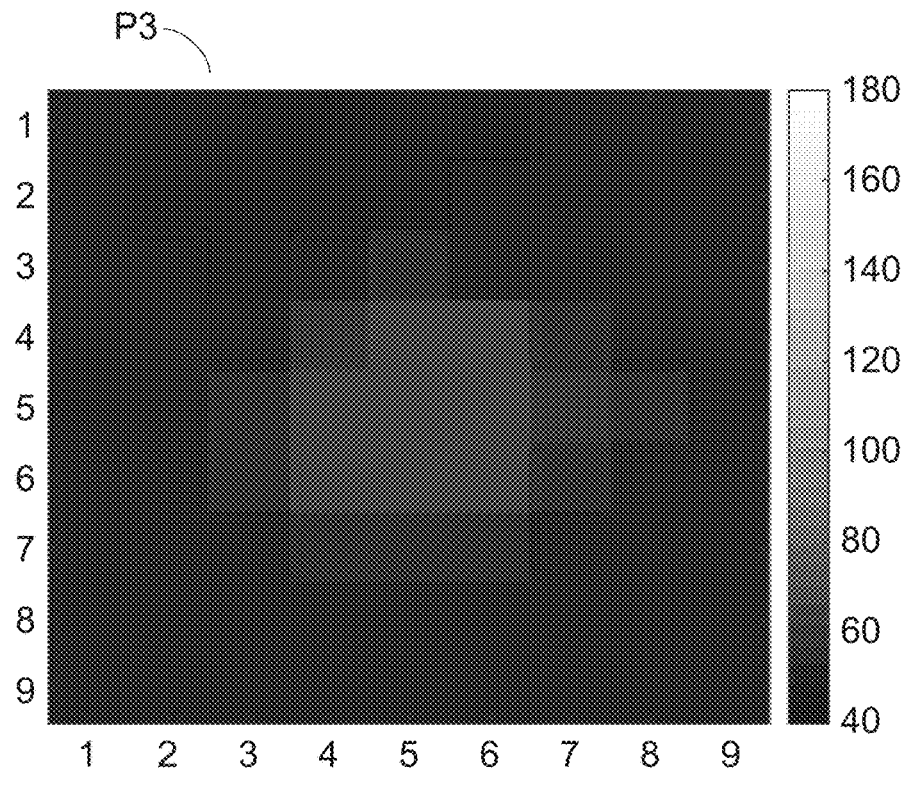
FIG. 5A schematically illustrates a portion of the transformation image.
FIG. 5B schematically illustrates the pixel values of the pixels in the transformation image shown in FIG. 5A.

The procedures of the step S3 will be described in more details with reference to FIGS. 5A and 5B. FIG. 5A schematically illustrates a portion of the transformation image P3. FIG. 5B schematically illustrates the pixel values of the pixels in the transformation image P3 shown in FIG. 5A.

In an embodiment, the intensity transformation process is an H-max transform process. The intensity transformation process is a morphological processing process used to suppress the intensity of each projection point in the erosion image P2 according to the intensity threshold and filter out the noise in the erosion image P2. The intensity threshold is a manually set reference value. The intensity transformation process is performed to firstly find each projection point and suppress the brightest local pixels and then determine whether the corresponding pixels in the erosion image P2 are retained according to the set intensity threshold. The mathematical formula of the intensity transformation process can be expressed as:

$$H_h(A) = (A(p) - h) \oplus A(p) \qquad \text{(formula 2)}$$

In the mathematical formula (2), $H_h$ represents the operator of the intensity transformation process, $\oplus$ represents the dilation operation, A represents the input image (i.e., the erosion image P2), p represents the pixel in the erosion image P2, and h represents the intensity threshold. The main purpose of the intensity transformation process is to find the local maximum value in the erosion image P2, and its value must be greater than or equal to the intensity threshold (h). Consequently, a connected set of pixels with equal grayscale are combined to form a local maximum value. In other words, it is necessary to use the dilation operation.

Therefore, the intensity transformation process may comprise the following steps. Firstly, the pixels in the erosion image P2 that are greater than or equal to the intensity threshold are decreased. Then, the pixels in the erosion image P2 that are less than the intensity threshold are decreased or filtered out.

In the mathematical formula (2), each pixel value (p) in the erosion image P2 is subtracted from the intensity threshold (h), and then the result is processed by the dilated mask of the erosion image P2. That is, the subtracted image is used as the seed for dilation, and dilation and masking operations are performed repeatedly until convergence. In the process of continuous dilation, the area in the image will be gradually filled until the dilation is stopped. The result is that the image has pixels with the maximum value of the intensity threshold (h). The dilation operation performed in this process is to find the local maximum value from the erosion image P2, suppress the smaller parts of the background, and highlight the significant parts.

As mentioned above, the portion of the erosion image P2 shown in FIGS. 4B and 4C is the transform target of the intensity transformation process. After the erosion image P2 is subjected to the intensity transformation process, the transformation image P3 shown in FIG. 5A is generated. The pixel values of the pixels in the corresponding locations of the transformation image P3 are shown in FIG. 5B. It can be understood that the setting of the intensity threshold is dependent on the user's requirements for the projection application and the characteristics of the projected image. After the intensity transformation process is completed, the light part and the dark part in the image can be effectively distinguished.

After the results of FIGS. 5A and 5B are compared with the results of FIGS. 4B and 4C, it can be found that the intensity in the center of the projection point (i.e., the bright spot) is significantly reduced but the intensity around it is not much different after the intensity transformation process. For example, the highest pixel value in FIG. 4C is 105. In this embodiment, the intensity threshold is 65. Consequently, the highest pixel value in FIG. 5B is only 65.

However, the location of the projection point can be completely circumscribed. In other words, the purpose of the intensity transformation process is to enhance the location of the projection point that is used as the foreground. Even if there may be projection points that are originally darker, they can be highlighted through this process and will not be ignored.

Figures 6A, 6B:
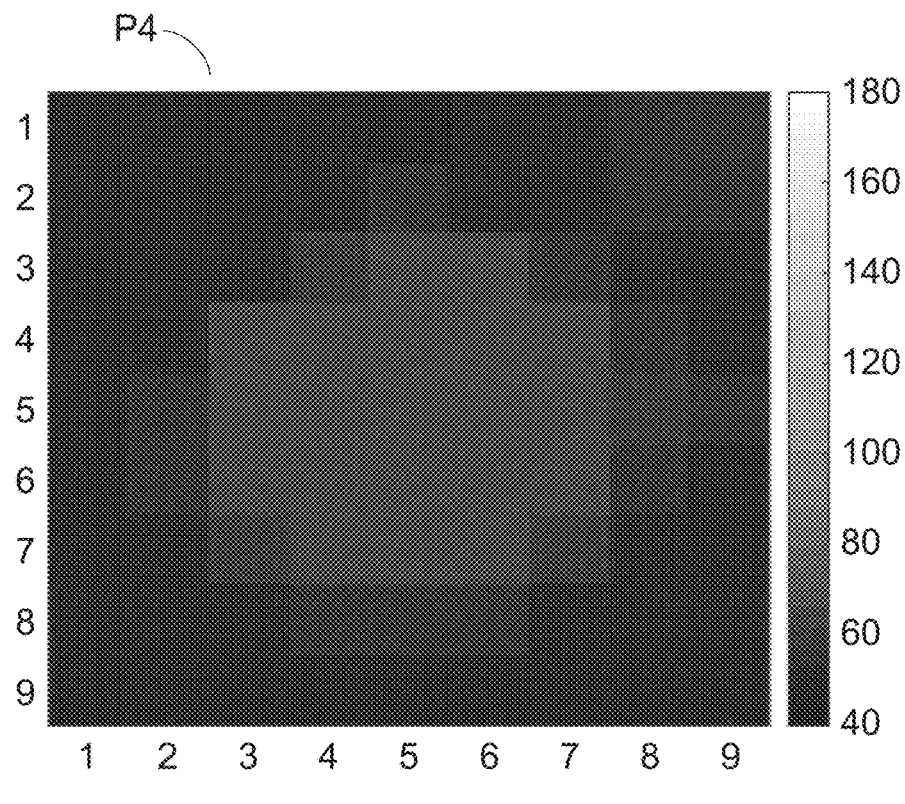
FIG. 6A schematically illustrates a portion of the reconstruction image.
FIG. 6B schematically illustrates the pixel values of the pixels in the reconstruction image shown in FIG. 6A.

The procedures of the step S4 will be described in more details with reference to FIGS. 6A and 6B. FIG. 6A schematically illustrates a portion of the reconstruction image P4. FIG. 6B schematically illustrates the pixel values of the pixels in the reconstruction image P4 shown in FIG. 6A.

The reconstruction process is a morphological processing process. In an embodiment, the reconstruction process is used to perform a dilation operation on each projection point in the transformation image P3 in order to restore the characteristics of the corresponding region of the original image P1. As far as FIGS. 3A to 5B are concerned, the projection point has been successively subjected to the erosion process and the intensity transformation process from its original state. Since the size, shape and other characteristics of the projection point are no longer in its original state, it is necessary to restore its size and shape. This reconstruction process must use the original image P1 as a sample to restore its original contours and features. The mathematical formula of this reconstruction process can be expressed as:

$$R = (F \oplus R') \cap G \qquad \text{(formula 3)}$$

In the mathematical formula (3), $\oplus$ represents the dilation operation, R represents the obtained reconstruction image P4, F represents the transformation image P3, G represents the original image P1, R' represents an iterative image (not shown), and its initial value is R.

Therefore, the reconstruction process may comprise the following steps. Firstly, an iterative image is set. The iterative image has the same dimensions as the original image P1. In addition, all pixels of the iterative image are 0. Then, the iterative image and the transformation image P3 are subjected to the dilation operation. Then, the operation result is intersected with the original image P1. Consequently, the reconstruction image P4 is obtained.

The iterative image may be regarded as the initialization image of the reconstruction image P4. The iterative image has the same size as the original image P1. However, the values of all pixels in the iterative image are firstly initialized to 0. After the iterative image and the transformation image P3 are subjected to the dilation operation, the result is intersected with the original image P1. In an embodiment, plural reconstruction operations are performed. That is, the reconstruction image P4 generated at each time is regarded as a new iterative image, and the dilation operation is performed after substitution.

Therefore, the reconstruction process comprises the following steps. For example, the generated reconstruction image P4 is continuously iterated until the newly generated reconstruction image P4 is no longer changed, or the generated reconstruction image P4 is continuously iterated until a predetermined iterative value reaches. In a preferred embodiment, the predetermined iterative value is 2. That is, the dilation operation needs to be performed at least twice.

After the reconstruction process is completed, the generated reconstruction image P4 will contain all the pixels of the original image P1 associated with the transformation image P3. That is, by continuously dilating the transformation image P3, the reconstruction image P4 associated with the transformation image P3 will be created.

As mentioned above, the portion of the transformation image P3 shown in FIGS. 5A and 5B is the reconstruction object of the reconstruction process, and generated reconstruction image P4 is shown in FIG. 6A. The pixel values of the pixels in the corresponding locations of the reconstruction image P4 are shown in FIG. 6B. Especially, when the dilation operation is performed, the transformation image P3 is dilated by an isotropic structural element, and the generated reconstruction image P4 will be limited to the range of the original image P1. In other words, the original image P1 is the instruction target for expanding the transformation image P3.

After the results of FIGS. 6A and 6B are compared with the results of FIGS. 5A and 5B and the results of FIGS. 3A and 3B, it can be found that the intensity in the center of the projection point (i.e., the bright spot) is significantly enhanced but still much different from the surrounding background after the reconstruction process. For example, the highest pixel value in FIG. 5B and the highest pixel value in FIG. 6B are both 65. However, the area with a pixel value of 65 in FIG. 6B is larger than the area with a pixel value of 65 in FIG. 5B. This result approximately corresponds to the size of the projection point in the original image P1 shown in FIG. 3A. In other words, the reconstruction process can successfully fill in the defects in the transformation image P3 and restore the original features of the original image P1.

Figures 7A, 7B:
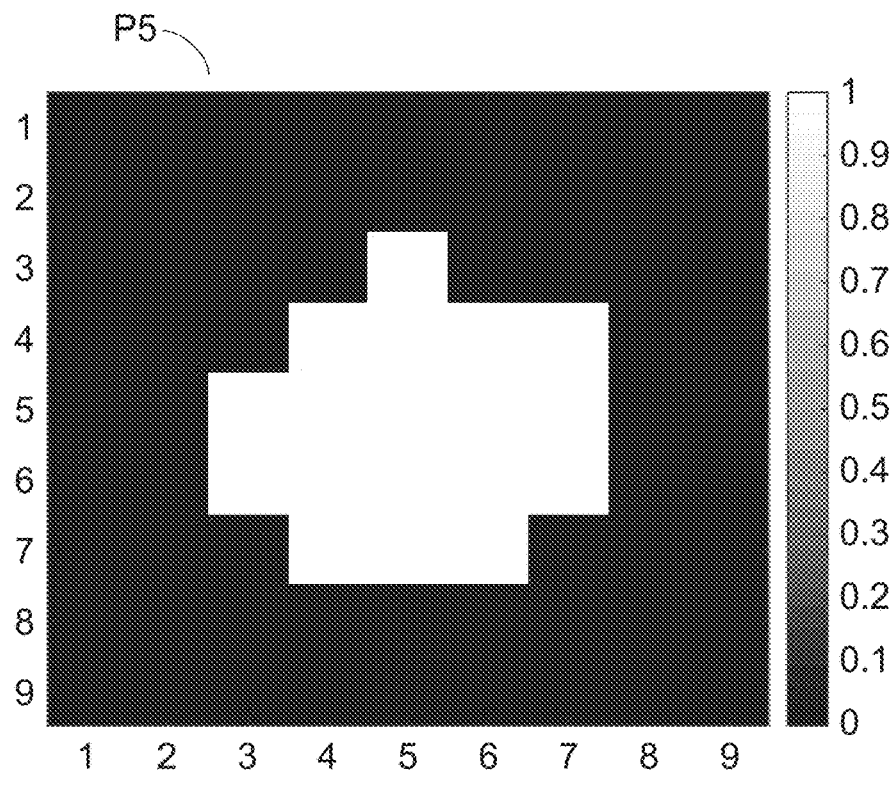
FIG. 7A schematically illustrates a portion of the mask map.
FIG. 7B schematically illustrates the locations of the maximum pixel values in the mask map shown in FIG. 7A.

The procedures of the step S5 will be described in more details with reference to FIGS. 7A and 7B. FIG. 7A schematically illustrates a portion of the mask map P5. FIG. 7B schematically illustrates the locations of the maximum pixel values in the mask map P5 shown in FIG. 7A.

In this embodiment, the generated reconstruction image P4 comprises plural preset regions. For example, the area shown in FIG. 6A is a preset region. Therefore, the entire of the reconstruction image P4 can be firstly segmented into plural regions similar to those shown in FIG. 6A according to the found projection points. Secondly, the regional maxima process is a morphological processing process used to determine respective maximum values in the preset regions and filter out the noise in the reconstruction image P4. The regional maximum value processed by this process refers to the maximum pixel value in a specified region. This maximum pixel value is a local maximum value that is larger than the values of its surrounding pixels. The mathematical formula of the regional maxima process can be expressed as:

$$R_m(A) = (A(p) > \max(A_n)), \text{ for all } A_n \in A(p) \qquad \text{(formula 4)}$$

In the above mathematical formula, $R_m$ represents the operator of the regional maxima process in this region, A represents the input image (i.e., the reconstruction image P4), p represents the pixels in the reconstruction image P4, $A_n$ represents a neighboring region of a specified region in the reconstruction image P4, and max $(A_n)$ represents the maximum value in $A_n$.

In the mathematical formula (4), A (p)>max $(A_n)$. That is, if a pixel (p) is the maximum value in the neighboring region $(A_n)$, the pixel value in A (p)>max $(A_n)$ is the pixel value of the pixel (p), otherwise it is the pixel value in max $(A_n)$. The result is that the retained pixel value is the maximum value in the neighboring region $(A_n)$. In addition, the pixel values smaller than the maximum value in the neighboring region ($A_n$) are all 0. For example, each pixel in the array or the image is scanned and compared with the pixels in its neighboring regions. If the pixel value larger than all neighboring pixels, it is added to $R_m$ (A). Consequently, $R_m$ (A) is the set of all local maximum values in the reconstruction image (A).

Therefore, the regional maxima process comprises the following steps. Firstly, all pixels of the reconstruction image P4 are scanned. Then, the pixel value of each pixel in each preset region is compared with the pixel values of other surrounding pixels. If the pixel value of the pixel to be compared is greater than or equal to all of the other surrounding pixels, the pixel value of the pixel to be compared is defined as the maximum pixel value in the corresponding preset region. Afterwards, the locations of the maximum pixel values in these preset regions are marked.

As mentioned above, the pixel value of each pixel in each preset region is compared with the pixel values of other surrounding pixels. For example, the pixel value of each pixel in each preset region is compared with the pixel values of eight neighboring pixels in the upper side, the lower side, the left side, the right side and the four diagonal directions of the pixel. In other words, if the pixel value of the pixel to be compared is greater than or equal to the eight neighboring pixels in the upper side, the lower side, the left side, the right side and the four diagonal directions, the pixel value of the pixel to be compared is defined as the maximum pixel value in the corresponding preset region.

As mentioned above, the portion of the reconstruction image P4 shown in FIGS. 6A and 6B is the processed target of the regional maxima process. After the reconstruction image P4 is subjected to the regional maxima process, the mask map P5 shown in FIG. 7A is generated. The maximal values of the pixels in the corresponding locations of the mask map P5 are shown in FIG. 7B. As mentioned above, the intensity threshold is 65. Moreover, in the stage of FIG. 6A, the pixel values of the projection points as the foreground have been adjusted to 65. Consequently, when the regional maxima process is performed on the region shown in FIG. 6A, the pixel value of 65 is the maximum pixel value in this region.

Therefore, the regional maxima process comprises the following steps. Firstly, the pixel value of the pixel defined as the maximum pixel value in the corresponding preset region is set as 1. Then, the pixel values of the pixels that are not defined as the maximum pixel value in the corresponding preset region are set as 0.

After the operation of the mathematic formula (4) is completed, the result is shown in FIG. 7B. As shown in FIG. 7B, the location marked as the maximum pixel value is represented by the value "1", and the other locations that are not the maximum pixel value are represented by the value "0". Therefore, in the mask map P5 shown in FIG. 7A, there are only two colors: white and black. The white part represents the maximum pixel value, which is the location of the projection point as the foreground. The black part represents the pixel value that is not the maximum pixel value, i.e., the background surrounding the projection point.

Figures 8A, 8B:
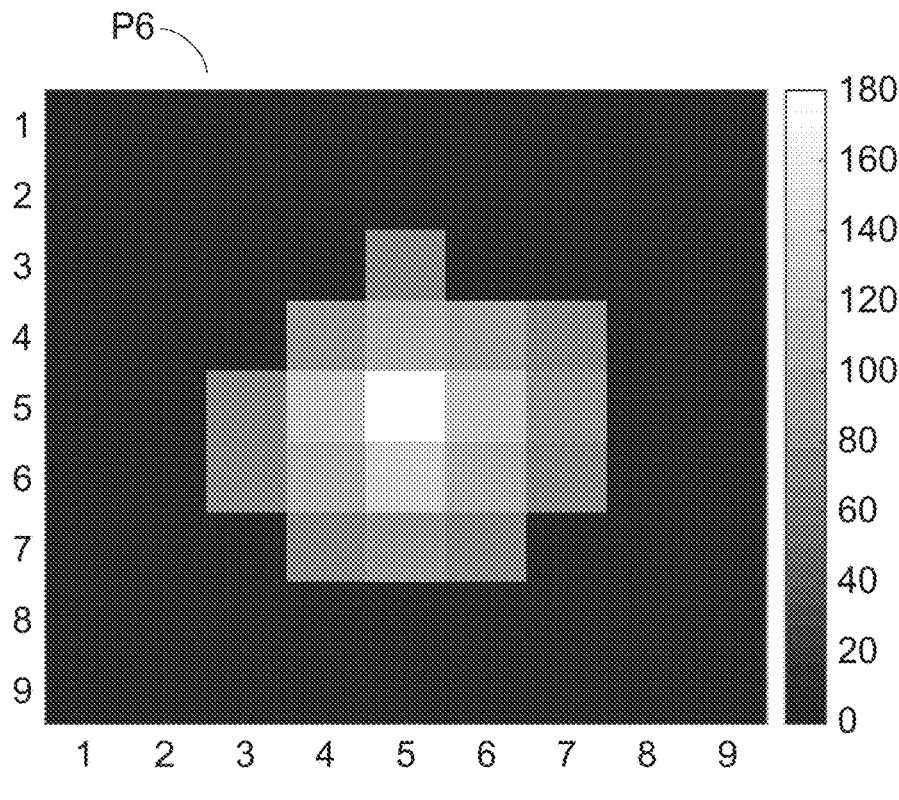
FIG. 8A schematically illustrates a portion of the projection point extraction result.
FIG. 8B schematically illustrates the pixel values of the pixels in the projection point extraction result shown in FIG. 8A.

The procedures of the step S6 will be described in more details with reference to FIGS. 8A and 8B. FIG. 8A schematically illustrates a portion of the projection point extraction result P6. FIG. 8B schematically illustrates the pixel values of the pixels in the projection point extraction result P6 shown in FIG. 8A.

As mentioned above, the generated mask map P5 is the corrected result that has been detected and is suitable for projection by the projection module 11 or the projection device 100. The white part of the mask map P5 represents the location of each projection point, which provides the location information of each projection point and the possible range of each projection point. As long as the mask map P5 is used to perform the comparison with the original image P1, the purpose of distinguishing the foreground and the background can be achieved. Consequently, the projection points can be highlighted. In other words, the mask map P5 can be regarded as a mold. By using the mold to imprint the corresponding location of the original image P1, the original projection point can be retained.

As mentioned above, the original image P1 and the corresponding pixel values are shown in FIGS. 3A and 3B, the mask map P5 and the corresponding maximum pixel value are shown in FIGS. 7A and 7B, and the projection point extraction result P6 and the corresponding pixel values are shown in FIGS. 8A and 8B. According to the comparison result, it can be found that the remaining pixels are the pixels whose original pixel value is greater than the intensity threshold of 65, especially the pixels at the central projection point. On the contrast, the pixel values of the other pixels all become 0. Therefore, only the original image of the pixels at these locations is retained after the extraction process. However, the pixels at the other locations become completely black or have a nearly black background.

In this embodiment, the extraction process is an image processing process. That is, after the mask map P5 is used to perform a multiplication operation on the original image P1, the projection point extraction result P6 is obtained. For example, the original pixel value of 105 in FIG. 3B multiplied by the value 1 at the corresponding location in FIG. 7B becomes the pixel value of 105 in FIG. 8B, and the original pixel value of 64 in FIG. 3B multiplied by the value 0 at the corresponding location in FIG. 7B becomes the pixel value of 0 in FIG. 8B. It is noted that the operation of the extraction process is not limited to the multiplication operation. That is, other operation methods with the same or similar effects can be used to perform related image processing process.

The projection points extracted by the projection point extraction method of the above embodiment are the projection results after correction or detection. According to the observations after the actual operations, it can be found that the darker projection points originally located at the edge of the entire projection range can be circumscribed in their respective preset region after the appropriate intensity threshold is set. Consequently, the brighter projection points and darker projection points can be taken into consideration, and all projection points will not be ignored as much as possible. In this way, the foreground and background of the image can be effectively distinguished from each other. In other words, when the projection point extraction method of the present invention is used to correct the projection content of the projection device or detect the output quality of the projection device, good results can be obtained.

From the above descriptions, the present invention provides a projection point extraction method. The conventional Otsu algorithm has shortcomings. For example, since the light and dark areas are segmented according to a threshold value, the foreground and the background are possibly unable to be correctly distinguished. The projection point extraction method of the present invention can effectively overcome the shortcomings of the conventional Otsu algorithm. Secondly, even if the number of projection points increases, the location of the projection point in each preset region can be correctly found by using the regional maximum value to suppress the maximum value of a local small region. Consequently, there will be no distinction error caused by the intensity difference between the edge and the center of the projection range.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A projection point extraction method for a detection system, the detection system comprising a projector, a projection plane, a receiver, and a processor, the projection point extraction method comprising steps of:

projecting an original image with plural projection points onto the projection plane by the projector, wherein after the original image is received by the receiver, the original image is transmitted to the processor;

performing an erosion process on the original image by the processor using a kernel executing an operation program code to generate an erosion image;

performing an intensity transformation process on the erosion image according to an intensity threshold by the processor executing the operation program code to generate a transformation image;

performing a reconstruction process on the transformation image according to the original image by the processor executing the operation program code to generate a reconstruction image;

performing a regional maxima process on the reconstruction image by the processor executing the operation program code to generate a mask map; and performing an extraction process on the original image according to the mask map by the processor executing the operation program code to generate a projection point extraction result.

2. The projection point extraction method according to claim 1, wherein the kernel is a matrix with a specified size, and corresponding elements of the matrix have identical or different contents.

3. The projection point extraction method according to claim 1, wherein the erosion process is a morphological processing process, wherein when the erosion process is performed, the kernel is used to scan the original image and suppress a surrounding background of the projection point in the scanned original image, so that a local maximum value of the corresponding projection point is obtained.

4. The projection point extraction method according to claim 1, wherein the erosion process comprises steps of:

placing the kernel at any location of the original image, and allowing a center of the kernel to be aligned with one pixel of the original image; and using the kernel to scan the original image, eroding pixels of the original image at locations corresponding to elements of the kernel, and combining each element in the kernel and the corresponding pixel as a new pixel according to an erosion condition.

5. The projection point extraction method according to claim 1, wherein the intensity transformation process is a morphological processing process, wherein when the intensity transformation process is performed, an intensity of each projection point in the erosion image is suppressed according to the intensity threshold, and noise in the erosion image is filtered out.

6. The projection point extraction method according to claim 1, wherein the intensity transformation process comprises steps of:

decreasing pixels in the erosion image that are greater than or equal to the intensity threshold; and decreasing or filtering out pixels in the erosion image that are less than the intensity threshold.

7. The projection point extraction method according to claim 1, wherein the reconstruction process is a morphological processing process, wherein when the reconstruction process is performed, each projection point in the transformation image is subjected to a dilation operation, so that characteristics of a corresponding region of the original image are restored.

8. The projection point extraction method according to claim 1, wherein the reconstruction process comprises steps of:

setting an iterative image, wherein the iterative image has same dimensions as the original image, and all pixels of the iterative image are 0; and performing a dilation operation on the iterative image and the transformation image to obtain an operation result, and intersecting the operation result with the original image, so that the reconstruction image is generated.

9. The projection point extraction method according to claim 1, wherein the reconstruction image comprises plural preset regions, and the regional maxima process is a morphological processing process, wherein when the regional maxima process is performed, respective maximum values in the plural preset regions are determined, and noise in the reconstruction image is filtered out.

10. The projection point extraction method according to claim 1, wherein the reconstruction image comprises plural preset regions, and the regional maxima process comprises steps of:

scanning all pixels of the reconstruction image;

comparing a pixel value of each pixel in each preset region with pixel values of other surrounding pixels, wherein if the pixel value of the pixel to be compared is greater than or equal to all of the other surrounding pixels, the pixel value of the pixel to be compared is defined as a maximum pixel value in the corresponding preset region; and marking a location of the maximum pixel value in each of the plural preset regions.

11. The projection point extraction method according to claim 1, wherein the extraction process is an image processing process, wherein when the extraction process is performed, the mask map is used to perform a multiplication operation on the original image, so that the projection point extraction result is obtained.

12. The projection point extraction method according to claim 1, wherein the detection system further comprises a flash memory storing the operation program code, the flash memory is electrically connected with the processor, and the projector, the receiver, and the processor are integrated as a projection device.

13. The projection point extraction method according to claim 1, wherein the receiver is a camera.

14. The projection point extraction method according to claim 8, wherein the reconstruction process further comprises a step of continuously iterating the generated reconstruction image until the newly generated reconstruction image is no longer changed or a predetermined iterative value reaches.

15. The projection point extraction method according to claim 10, wherein the other surrounding pixels for the pixel to be compared include eight neighboring pixels in an upper side, a lower side, a left side, a right side and four diagonal directions of the pixel to be compared.

16. The projection point extraction method according to claim 10, wherein in the regional maxima process, the pixel value of the pixel defined as the maximum pixel value in the corresponding preset region is set as 1, and the pixel value of the pixel that is not defined as the maximum pixel value in the corresponding preset region is set as 0.

\* \* \* \* \*